(12) United States Patent
Lim (10) Patent No.: US 6,690,373 B2
(45) Date of Patent: Feb. 10, 2004

(54) METHODS FOR IMPROVING VISIBILITY COMPUTATIONS IN 3D COMPUTER GRAPHICS

(76) Inventor: Hong Lip Lim, 35, Elite Park Avenue, Singapore 458856 (SG)

( * ) Notice: Subject to any disclaimer, the term of this patent is extended or adjusted under 35 U.S.C. 154(b) by 100 days.

(21) Appl. No.: 09/834,404

(22) Filed: Apr. 14, 2001

(65) Prior Publication Data

US 2002/0190995 A1 Dec. 19, 2002

(51) Int. Cl.⁷ .............................................. G06T 15/60
(52) U.S. Cl. ....................................... 345/426; 345/421
(58) Field of Search ................................. 345/421, 426

(56) References Cited

U.S. PATENT DOCUMENTS

| | | | | |
|---|---|---|---|---|
| 5,613,048 A | * | 3/1997 | Chen et al. ................. | 345/419 |
| 5,671,381 A | * | 9/1997 | Strasnick et al. ............ | 345/848 |
| 5,729,672 A | * | 3/1998 | Ashton ........................ | 345/589 |
| 5,739,819 A | * | 4/1998 | Bar-Nahum ................. | 345/426 |
| 5,808,617 A | * | 9/1998 | Kenworthy et al. ......... | 345/421 |
| 5,808,620 A | * | 9/1998 | Doi et al. .................... | 345/426 |
| 5,870,098 A | * | 2/1999 | Gardiner ..................... | 345/426 |
| 5,914,721 A | * | 6/1999 | Lim ............................ | 345/421 |
| 6,411,297 B1 | * | 6/2002 | Tampieri .................... | 345/426 |
| 6,476,807 B1 | * | 11/2002 | Duluk et al. ................. | 345/421 |

* cited by examiner

Primary Examiner—Mark L. Zimmerman
Assistant Examiner—Enrique L Santiago

(57) ABSTRACT

Disclosed are a set of methods for improving visibility computations in 3D computer graphics. Said methods are executed before said computations and determine surfaces visible or invisible in said computations. This invention describes various approaches whereby the speed and accuracy of these methods are improved.

7 Claims, 9 Drawing Sheets

Cutplane View of Several Patches

3D View of the Fuzzy Regions of the Patches in Figure 5

Figure 1: Topview of the Comparison of Two Fuzzy Extents

Figure 2: A 2-D View of Combining Several Wall Surfaces within a Viewcone

Figure 3: Combining Several Patches of Curved Wall Surfaces within a Viewcone

Figure 4: A Wall Surface that Occludes its Cells but behind its Bounding Volume in Fuzzy Projection Computations.

Figure 5: Cutplane View of Several Patches

Figure 6: 3D View of the Fuzzy Regions of the Patches in Figure 5

Figure 7: A Cell and a Hemicube in it.

Legend:

Current Cell

Cell adjacent to current cell

Cell 1 cell away from current cell

Figure 8: Different Kinds of Cells

Figure 9: Combination of Fuzzy Projection Planes.

METHODS FOR IMPROVING VISIBILITY COMPUTATIONS IN 3D COMPUTER GRAPHICS

CROSS-REFERENCE TO RELATED APPLICATIONS

Australian Provisional Patent Application No. PQ6911, Apr. 14, 2000 (claiming priority)

U.S. Patent Documents

U.S. Pat. No. 5,579,455, November 1996, Greene
U.S. Pat. No. 5,613,050, March 1997, Hochmuth
U.S. Pat. No. 5,751,291, May 1998, Olsen
U.S. Pat. No. 5,914,721, June 1999, Lim
U.S. Pat. No. 5,949,423, September 1999, Olsen
U.S. Pat. No. 6,172,679, January 2001, Lim Other References Airey, J. M., Increasing update rates in the building walkthrough system with automatic model-space subdivision and potentially visible set calculations. PhD Thesis, University of North Carolina 1990.
Durand, F., G. Drettakis, J Thollot and C. Pucch, Conservative visibility preprocessing using extended projections Siggraph 2000.
Greene, N, Hierarchical z-buffer visibility, Siggraph—93 conference, 1993
Greene, N., Hierarchical rendering of complex environments, PhD dissertation, University of California, Santa Cruz 1995.
Hornung, C., A method for solving the visibility problem, EEE Computer Graphics & Applications, vol. 4, 1984.
Koltun, V., Y. Chrysanthou and D. Cohen-Or, Virtual Occluders: An Efficient Intermediate PVS representation, EGRW'2000.
Lim, H. L., Rendering techniques in three-dimensional computer graphics, Ph.D. thesis, University of Sydney, 1993.
Schaufler, G., J. Dorsey, X. Decoret, and F. X. Sillion, Conservative Volumetric Visibility with Occluder Fusion, Siggraph 2000.
Teller S., Visibility Preprocessing for Interactive Walkthrough, Siggraph'91.
Teller, S., Visibility computations in densely occluded polyhedral environment, PhD. thesis, University of California at Berkeley, 1992.
Wonka P., D. Schmalstieg, Occluder Shadows for Fast Walkthroughs of Urban Environments, Eurographics'99.
Wonka, P., Michael Wimmer, Dieter Schmalstieg, Visibility Preprocessing with Occluder Fusion for Urban Walkthroughs, EGRWS 2000.

Statement Regarding Federally Sponsored Research OF Development

Not Applicable

Reference TO Sequence Listing, A Table, OR A Computer Listing Appendix

Not Applicable

BACKGROUND OF THE INVENTION

1. Field of Invention

The present invention relates to computer graphics and, in particular, to the efficient determination of visible and/or invisible surfaces to thereby preferably permit improved visibility or visibility-related computations, generally in 3D systems.

2. Description of the Prior Art

In 3D computer graphics, the determination of the visibility of surfaces is known as hidden surface removal and is performed by the hidden surface algorithms. The most common hidden surface algorithm has been the z-buffer algorithm. However, the traditional hidden surface removal approach is incapable of treating visible and invisible surfaces differently. They have to accord the same importance to all these surfaces and treat them in equal detail to determine their visibility. To address this limitation, a new generation of techniques known as the occlusion culling methods have been created. These methods apply various strategies to quickly decide whether some surfaces are hidden by the other surfaces (the occluders). The present invention is based heavily and borrows many terminologies from the earlier references by Airey, Teller and the inventor of this application

BRIEF SUMMARY OF THE INVENTION

It is an object of the present invention to substantially overcome or ameliorate the problems associated with the prior art, through provision of improved methods for performing visibility calculations.

In accordance with one aspect of the invention, there is disclosed a method of detecting, before normal hidden surface computations, surfaces or their sub-elements that are invisible, wherein said surfaces or their sub-elements are excluded from said hidden surface computations.

In accordance with another aspect of the invention, there is disclosed a method of detecting, before normal hidden surface computations, surfaces or their sub-elements that are visible, wherein said surfaces or their sub-elements are excluded from said hidden surface computations.

In accordance with another aspect of the invention, there is disclosed a method of detecting, before normal hidden surface computations, surfaces or their sub-elements that are invisible, further comprising the step of determining surfaces or their sub-elements that are visible, wherein only the remaining surfaces or their sub-elements are excluded from said hidden surface computations.

In accordance with another aspect of the invention, there is disclosed a method of detecting, before normal hidden surface computations, surfaces or their sub-elements that are invisible, wherein said surfaces or their sub-elements are excluded from said hidden surface computations. Said method further comprises the step of storing in computer storage information for said hidden surfaces, and the step of subsequently accessing said stored information for said hidden surface computations.

In accordance with another aspect of the invention, there is disclosed a method of detecting, before normal hidden surface computations, surfaces or their sub-elements that are invisible, wherein said surfaces or their sub-elements are excluded from said hidden surface computations. Said method comprises the steps of determining the penumbra regions, and checking, for each surface whose visibility is to be determined, whether the projection of said surface falls within on said penumbra regions.

In accordance with another aspect of the invention, there is disclosed a method of detecting, before normal hidden surface computations, surfaces or their sub-elements that are invisible, wherein said surfaces or their sub-elements for said hidden surface computations. Said method further comprises the steps of combining the fuzzy projections, and the determination of the relationship between the combined fuzzy projections with the projections of surfaces whose visibility are to be determined.

In accordance with another aspect of the invention, there is disclosed a method of detecting before normal hidden surface computations, surfaces or their sub-elements that are invisible, wherein said surfaces or their sub-elements are excluded from said hidden surface computations. Said method further comprises the steps of computing the probabilities of areas on the fuzzy projection planes or the combined fuzzy projection planes; and determining whether said areas are fully occluded based on the probabilities computed.

DETAILED DESCRIPTION OF THE INVENTION

Description of the First Preferred Embodiment

An architectural model is usually partitioned into cells by large and static surfaces that represent walls. At the boundaries of these cells are portals (for example, holes on wall surfaces or gaps between wall surfaces) that act as doors or windows. A new fuzzy projection technique is described here that can effectively exploit the coherence of the architectural models used for interactive walkthrough.

1.1 Model Construction

The first step of the technique is the construction of the geometric model A flat surface may be represented by a single polygon. A curved surface can be subdivided into patches that are in turn approximated by flat polygons.

The wall surfaces and portals on the cell boundaries are determined. In some models there may be wall surfaces within the cells. To maximize the efficiency, these surfaces can be manually designated as being walls, or detected automatically by checking whether their size is beyond certain threshold Patches in the environment can be treated as totally independent. However, information about the connectivity between wall patches is highly useful, especially if these patches are subdivided from curved surfaces, and hence are often small in size. Note that in an architectural environment an edge of a surface may be connected to several other surfaces and has to be recorded as such. This can be achieved through data structures such as the winged-edge structure that link connected surfaces or edges together.

1.2 Computation of Cell-to-Cell Visibility

The adjacency graph of the model is next computed. This is the graph that connects adjacent cells through the portals between them. Based on the graph, the visibility between cells are computed. The combined technique then uses the fuzzy projection technique to compute the visibility of these cells.

First, each cell is selected in turn, and becomes the source cell. All the other cells in the environment are recursively enumerated. Instead of depth-first search, the current technique carries out breath-first search to access these cells. Cells that arc immediate connected neighbours of the source cell are visited first. The immediate connected neighbours of these cells are visited if they have not been visited. The process repeats. Using this access method, cells accessible from n the source cell through more portals and hence less likely to be visible from the latter are visited later. Because the fuzzy projections on the fuzzy buffer are accumulated, the method ensures that these cells are more likely to be determined as invisible.

The pseudo-code of the method is shown below:

```
main ( )
{
    initialized cell_list and new_cell_list to NULL lists;
    add each cell that is connected to source cell to cell_list;
    while (cell_list is not a NULL list) {
        access cell (cell_list);
        replace cell list by new_cell_list;
        initialized new cell ist to NULL list;
    }
}
access_cell (celilist)
{
    for (each cell in the cell_list) {
        determine whether the cell is likely visible from the source cell;
        if(cell is likely visible) {
            for (each cell connected to the cell) {
                if (connected cell has not been added to new_cell_list
                    in current OR previous access_cell calls)
                    add connected cell to new_cell_list;
```

-continued

```
            }
         }
      }
}
```

Each cell being accessed becomes the target cell. The current technique determines whether the cell is likely visible by comparing the umbra regions that have been scan-converted with the fuzzy projection of the cells. The fuzzy region of the cell is then computed. This region may be approximated by the fuzzy region of the bounding box of the cell, or by combining the fizzy regions of all the surfaces or patches within the cell (in this specification, a surface generally refers to a standalone surface while a patch refers to sub-surface subdivided from a surface. However, all the techniques described in this specification do not make any discrimination between surfaces and patches. They can treat a surface totally as a patch and vice versa. Hence, the term surfaces and patches are completely interchangeable in this specification.) The depth of the cell is the shortest distance from the cell to the current portal. Each pixel on the fuzzy buffer under the region is examined. If no umbra region has been scan-converted to the pixel, or if the depth stored on the pixel record is larger than the depth of the cell, that cell is likely to be visible. If all the pixels being examined do not indicate that the cell is likely visible, the cell is deemed to be totally invisible from the current portal arid can be ignored.

If the cell is not found to be totally invisible, the umbra regions of its wall surfaces facing the current portal have to be scan-converted to the fuzzy buffer so that they can be used to detect cells hidden by it. (The direction of a wall is always taken to be the direction pointing away from its cell.) There are several possible methods to compute these regions.

A simpler method is to compute and scan-convert the umbra regions of the wall patches belonging to the cell and facing the viewpoint-bounding box of the portal, using the basic fuzzy projection method. (The viewpoint-bounding box applies to a group of viewpoints. In the case where the group has only a viewpoint, the box degenerates to a point. Unless otherwise specified, all the techniques described in this invention are applicable to a single viewpoint if they are applicable to a group of multiple viewpoints).

1.3. Fuzzy Projection Computations with the Use of Patch Connectivity

If the wall patches in the environment are not sufficiently larger than the current portal, their umbra regions may be very small or non-existent. Consequently, the current technique would be ineffective. This problem can be overcome by subdividing the portal into smaller portals. However, such an approach can generate substantially more portals. Patch connectivity may be used here to overcome this problem and further improve the efficiency of the fuzz computations. The patch connectivity strategy applies the property that when two patches share a boundary there would be no visibility change of other patches at the boundary if they were behind these patches.

Two types of patch connectivity can be used: inter-surface connectivity and intra-surface connectivity. The inter-surface connectivity is used for patches subdivided from a curved surface. The umbra regions of these patches often do not exist because the sizes of such patches are usually smaller than that of the portal. Hence, to compute umbra regions, all the patches from the same surface and facing the current portal are determined. Each group of these patches that are connected is found. The contour edges of the group are the edges of the patches in the group that are not shared by more than one of these patches.

Because all the patches within a group are front-facing, the whole group can be treated as a large patch. The umbra region of the group is computed by subtracting the fuzzy regions of the contour edges from the combined fuzzy regions of the patch. By applying the strategy of erring on the side of caution, the distance of the group from the current portal is the furthest possible distance of the patches to the portal. Having computed this information, the umbra regions of each curved surface can be scan-converted to the fuzzy buffer.

The inter-surface connectivity is used for patches belonging to different surfaces. Most wall surfaces in architectural models are connected to each other. The fuzzy projection computation may not be fully effective if each wall patch is treated as an independent patch, even if the patch is relatively large compared with the current portal. To achieve more effective fuzzy projection, the umbra projection of a wall patch (in the case of a flat wall, the whole wall surface is or can be considered as a patch) or a group of patches (in the case of a curved wall) can be expanded by including front-facing patches connected to them but belonging to different surfaces A recursive routine is used to obtain these patches. Starting from each patch of the current surface that is connected to another surface, connected patches that have not been added to the current surface is recursively accessed. In a large model, many surfaces can be inter-connected and many patches can be added this way. Accessing and adding too many patches is unnecessary and could result in too much overhead. This can be avoided by defining a viewcone whose vertex is at the centre of the current portal. The cone extends a solid angle such that its side surrounds the current wall surface while leaving an ample gap from it. The recursive access is restricted to patches inside or intersecting the solid angle.

Figure 2:
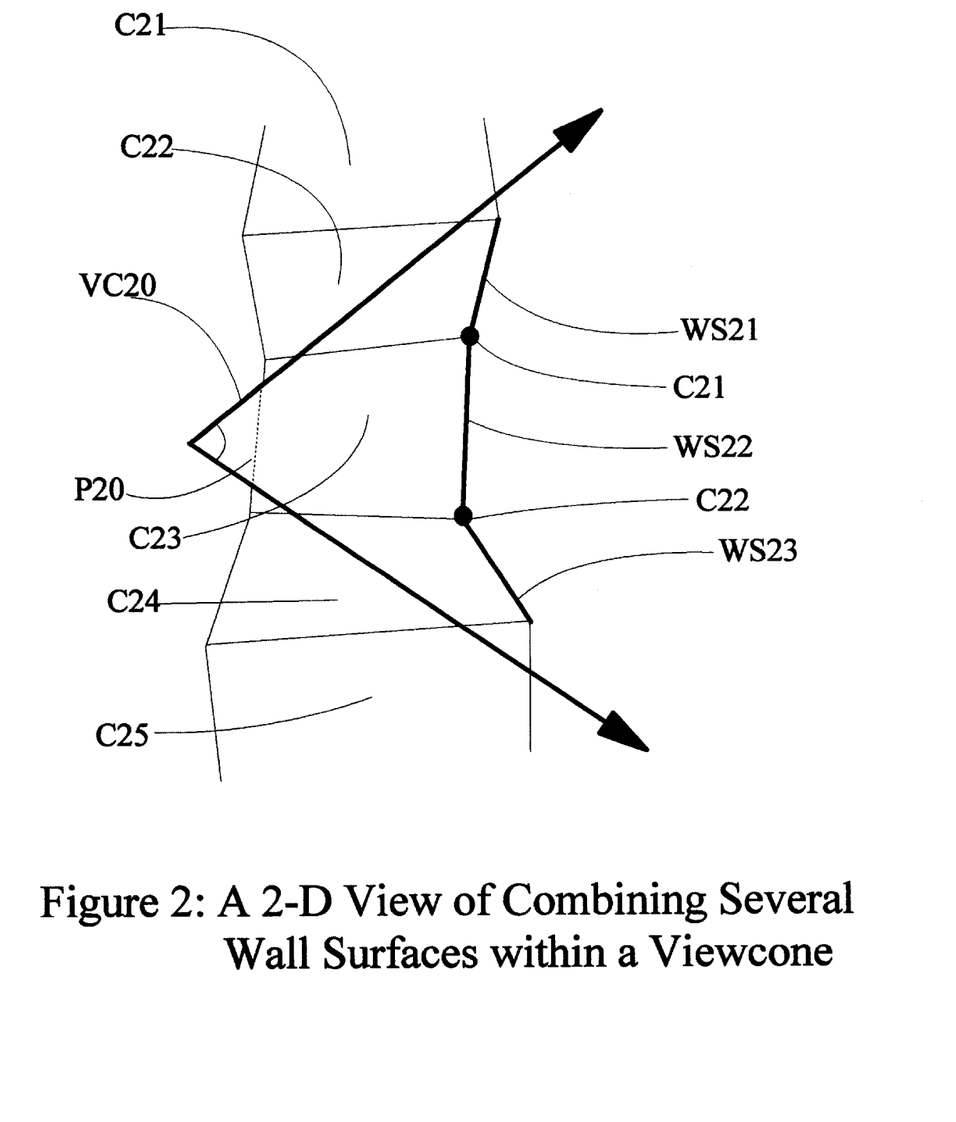
FIG. 2 is a 2-D view of combining several flat wall surfaces within a viewcone.

FIG. 2 show patches accessed by the recursive access operation. In FIG. 2, C21, C22, C23, C24 and C25 are cells. P20 is a large portal. VC20 is the viewcone. WS21, WS22, WS23 are wall surfaces C21 and C22 are the junctions between the cell boundaries, where inter-surface connectivity is facilitated.

Figure 3:
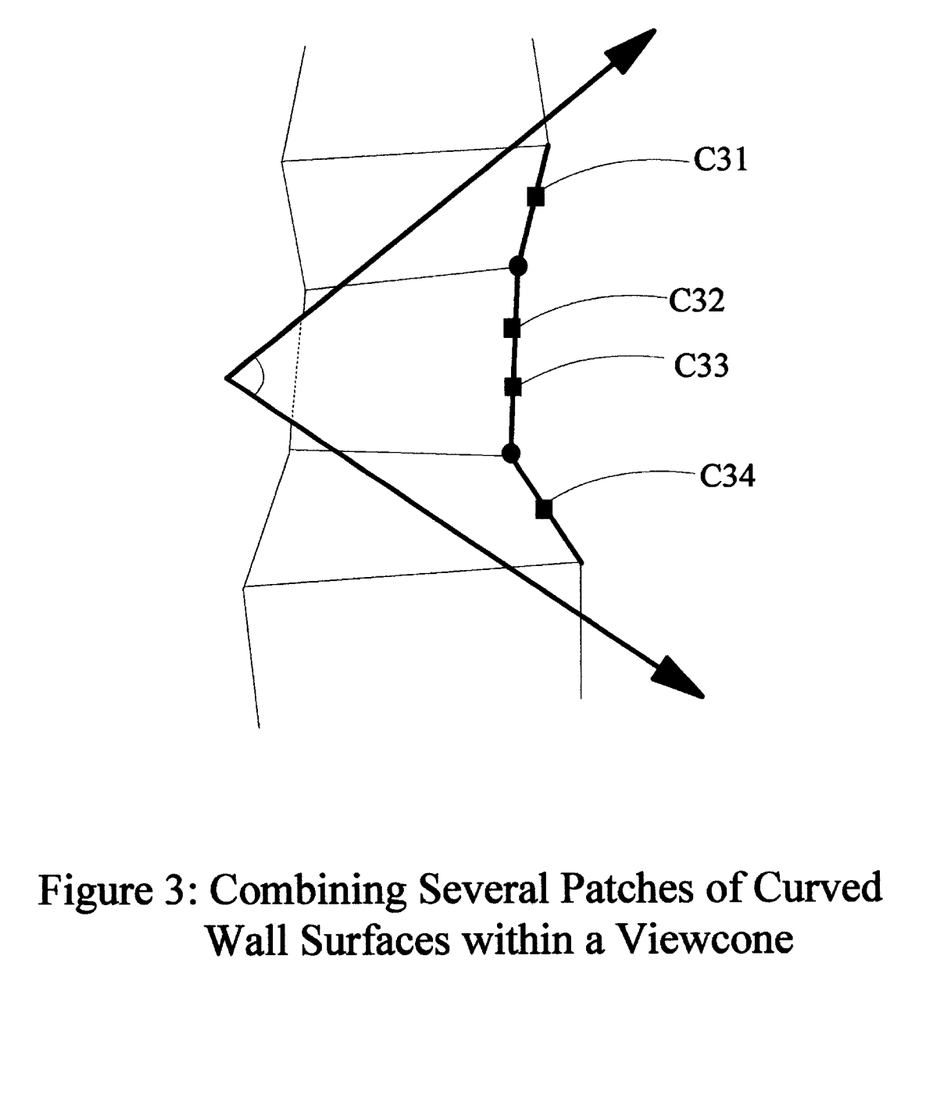
In FIG. 3, the combining several patches of curved wall surfaces within a viewcone

FIG. 3 has the same surface structure as FIG. 2, but further shows the intra-surface connectivity at C31, C32, C33 and C34.

The pseudo-code of the recursive access is shown below:

```
for each patch in the current group
    for (each connected parch of other surface)
        add_patch (connected patch);
add_patch (patch)
{
```

```
    if (patch within view cone and has not been added to current
    surface)
        (include patch to list of patches belonging to current surface;
    for (each connected patch of the patch)
        add_parch (connected patch);
    }
}
```

All the patches accessed by the above method are combined with the current patch or the current group of patches to produce a larger group of patches. This new group is treated as if it is a single surface. Some of the original contour edges now become internal edges. Its umbra region is computed by subtracting the fuzzy regions of the remaining contour edges from the combined fuzzy region of its patches. Its closest depth is the furthest distance of its patches to the current portal. The umbra region is then scan-converted to the fuzzy buffer Notice that although patches belonging to other surfaces have been included for the computation of the umbra regions of the current patch, their umbra regions still need to be scan-converted when they become the current patch.

1.4 Fast Detection of Totally Invisible Cells

Figure 4:
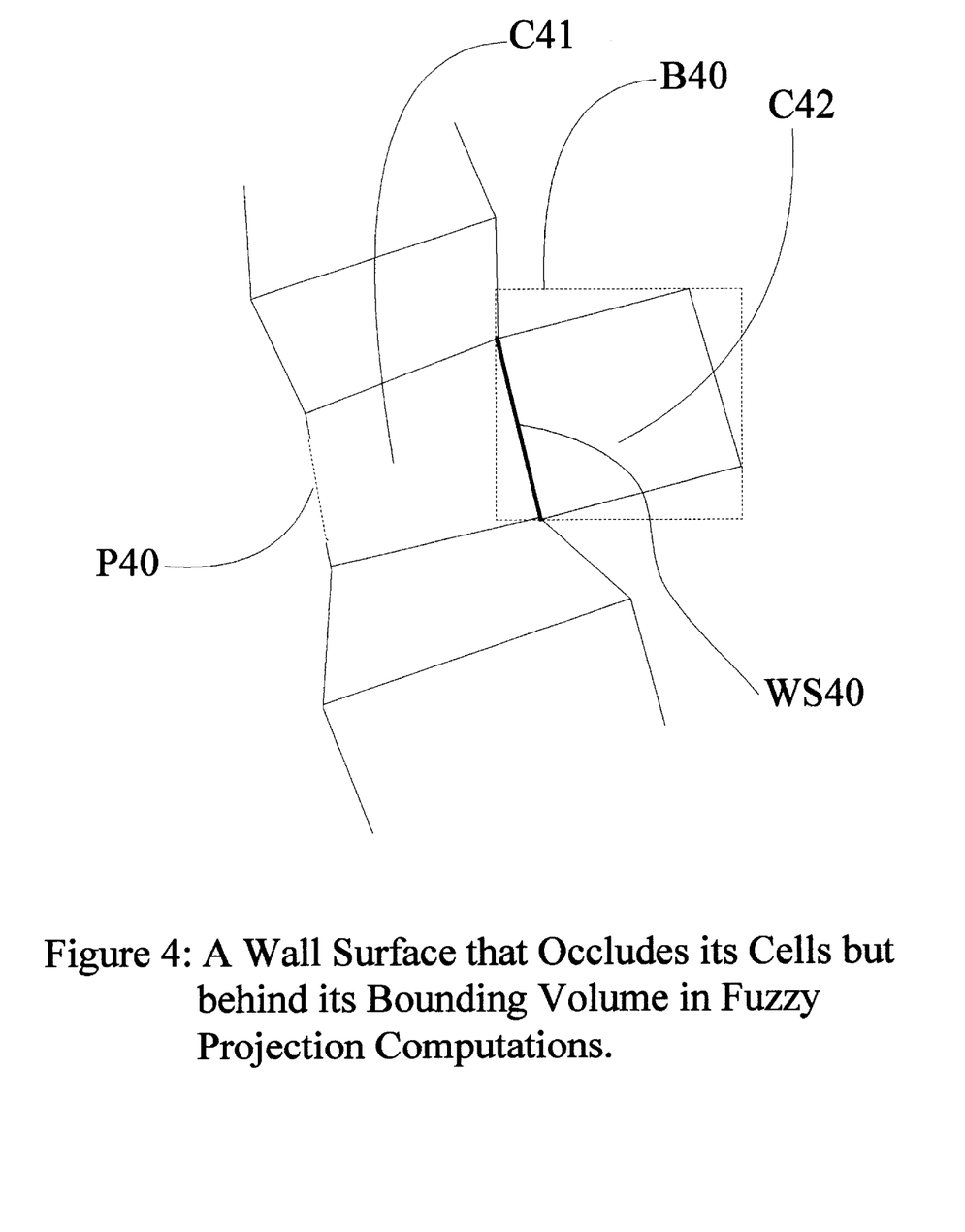
FIG. 4 shows a wall surface that occludes its cells but behind its bounding volume in fuzzy projection computations.

A cell could be totally hidden from a portal by its own walls yet could not be detected as such by the fuzzy projection computations. This is because the computational strategy of erring on the side of caution always determines that its bounding box is closer to the current portal than these walls. This is shown in FIG. 4. In it, C41 and C42 are cells. P40 is the current portal. B40 is the bounding box of cell C42. WS40 is the wall surface that cannot be determined to be in front of cell C42.

For fast detection of these cells, the wall patches of the cell that face at least one point in the current viewpoint-bounding box is be computed. These patches include patches that always face the viewpoint-bounding box, and patches whose principal planes intersect the box. If there is no portal attached to or inside all these patches, the walls of the cell always occlude items in the cell with respect to any viewpoint in the viewpoint-bounding box. Hence the cell is always invisible with respect to the box and can be ignored without much computation 1.5 Further Culling of Invisible Patches During Walkthrough During walkthrough, the basic fuzzy hidden surface algorithm can be carried out The series of viewpoints in the current cell arc combined into viewpoint groups. The list of cells and their contents visible to the current group can then be determined using the algorithm.

The cell-to-cell visibility computations may be computed in real-time rather than during the preprocessing stage. During the visibility walk-through, the structure, contents, and the cell-to-cell visibility of the cells the viewer is likely to enter may be computed just before they become visible. Information of cells that are unlikely to be visible may be deleted. This strategy allows the display of a dynamically changing virtual world that can have unrestricted complexity.

Description of the 2$^{nd}$ Preferred Embodiment

Information about pairs of patches where there is no obstruction of sight between each pair can be used to speed up radiosity computations. However, their techniques determine these patch pairs by computing a volume surrounding each pair and testing all other patches against it. The computations are complicated and have high growth rates. Below is a faster approach that uses fuzzy projection computations to determine these patches.

2.1 Model Construction

The technique assumes that, after the culling of back faces, a surface does not hide itself from any point in the current viewpoint-bounding box. This restriction is imposed so that, after back-face culling, the surface on which there is a group of viewpoints never curve back and hide other surfaces from these viewpoints. This restriction simplifies the fuzzy projection computations as only surfaces not belonging to these viewpoints need to be considered. All planar and quadric surfaces have this property. Other surfaces may be subdivided into smaller surfaces that satisfy this condition.

As a preprocessing step, surfaces in the environment are subdivided into patches. With this topdown subdivision, patches in the environment are organized as hierarchy. In the hierarchy, each non-leaf patch contains pointers that link to its child patches. After the subdivision, a bounding box is computed for each leaf patch. By recursively accessing the ancestor patches of the leaf patch, and enlarging their bounding volumes, the bounding box of each non-leaf patch contains the bounding boxes of all its descendent patches.

2.2 The Direct Comparison Method

After the construction of the patch hierarchy, the inter-visibility of patches in the hierarchy is computed. Either the direct comparison method or the fuzzy buffer method can be used. To achieve maximum efficiency, the methods may also be applied in tandem. This section discusses the direct comparison method.

For each group of viewpoints, the processing starts from the highest level of the hierarchy. This level becomes the current level. Each patch in the current level is accessed by turn. It is ignored if it belongs to the surface on which the viewpoints are placed. Otherwise, its fuzzy extent on each fuzzy projection face is computed. The patch is referred to as the primary patch.

All the other patches in the same level are accessed. A patch is bypassed if it again belongs to the surface on which the viewpoints would be placed. Otherwise, its fuzzy extent on each fuzzy projection face is computed. The patch is referred to as a secondary patch.

Figure 5:
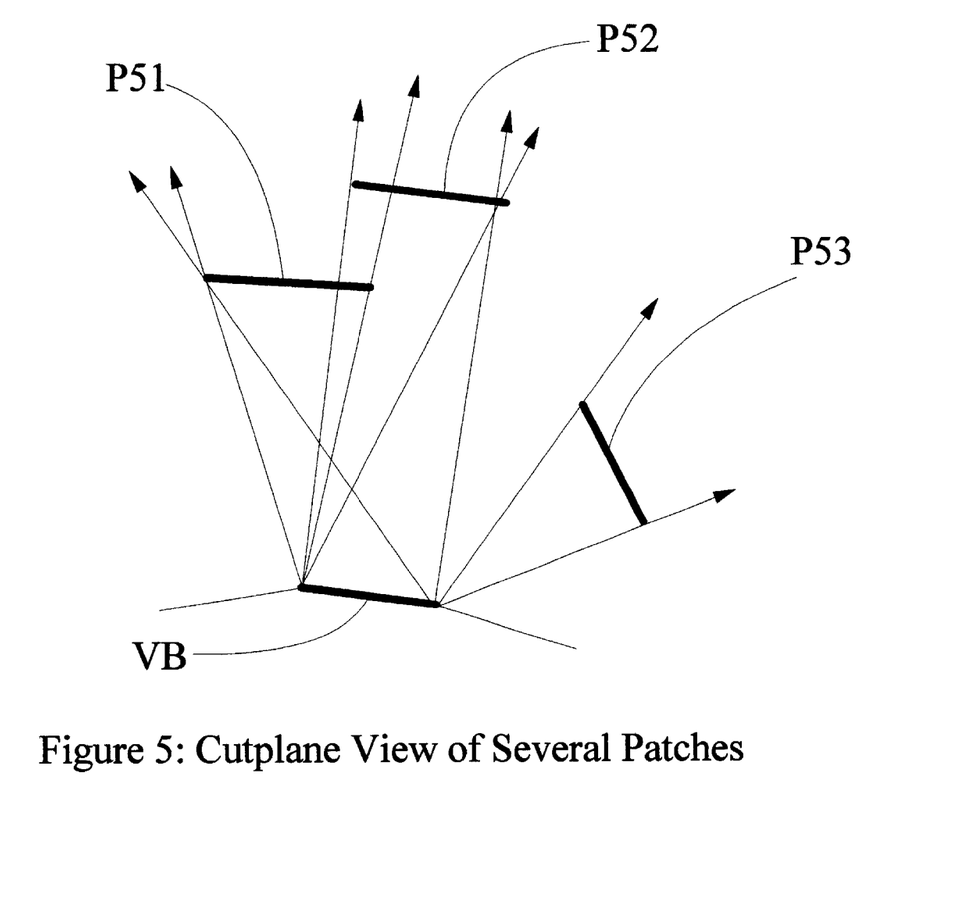
FIG. 5 is the cutplane view of several patches
Figure 6:
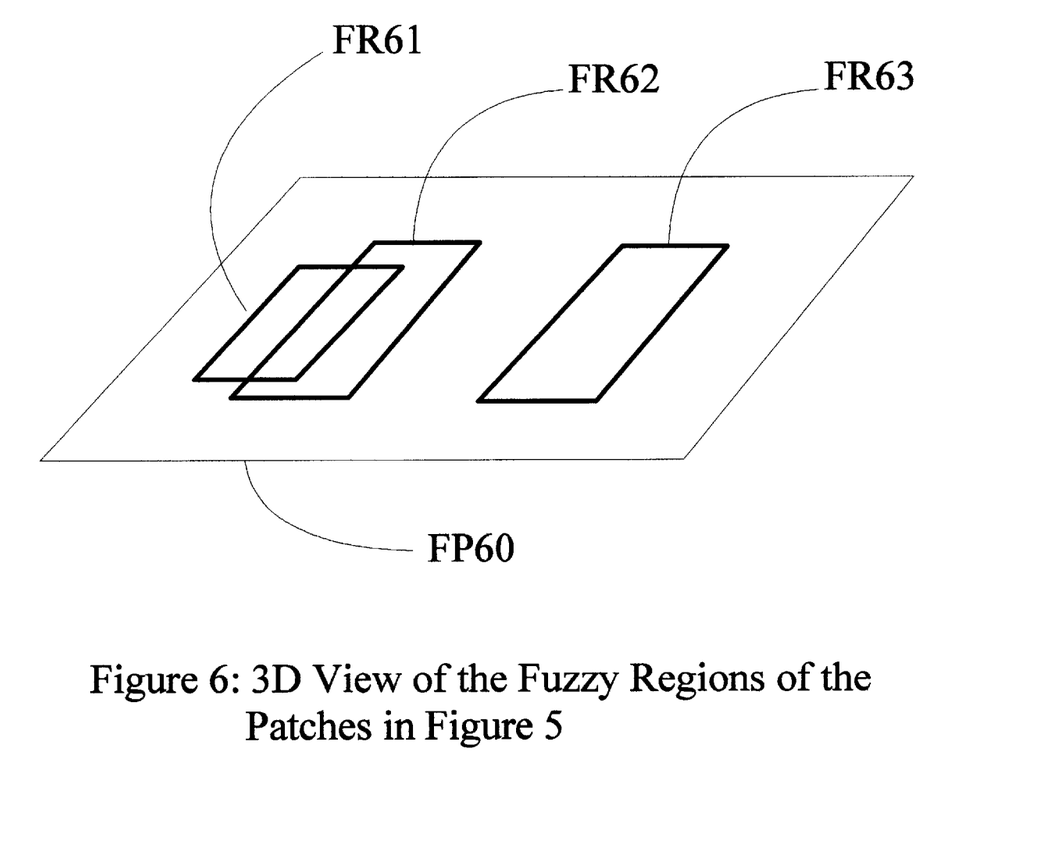
FIG. 6 shows the 3D view of the fizzy regions of the patches in FIG. 5

Each point on the fuzzy projection box represents a unique viewing direction of all the viewpoints in the current group of viewpoints. Hence, if the fuzzy regions of two patches occupy the same point, the patches may be in the same viewing direction and hence they may have some occlusion relationship with respect to one or more viewpoints in the current group. Conversely, if the two regions do not occupy any point on the fuzzy projection box, there would be no sharing of viewing direction and hence no overlap of the patches with respect to any viewpoints in the current viewpoint group. Therefore, if the test indicates that the two regions do not overlap, the two patches do not hide each other. A 2D view of these situations with respect to a degenerated viewpoint bounding box VB is shown in FIG. 5. FIG. 6 shows the 3D perspective view of the fuzzy regions of these patches. In FIG. 5, patch P51 and patch P52 hide each other because their fuzzy regions overlap (FR61 and FR62 in FIG. 6). Patch P53 is totally visible because its fuzzy region (FR63) is totally disjoint from the fuzzy regions of P51 and P52.

Since the set of viewing directions within the fuzzy extent of a patch is a superset of the viewing directions within its fuzzy region and on the same fuzzy projection face, the fuzzy regions can be approximated by their fuzzy extents and the above deduction still holds. Likewise, the fuzzy region of a patch may be replaced by the fuzzy extent/fuzzy region of the bounding box of that patch. These approximations can substantially speed up the fuzzy projection computations with some reduction in the number of totally visible patches that can be detected.

To determine totally visible patches, the patch hierarchy is accessed from the root node. Each patch accessed becomes the primary patch. Its bounding box becomes the viewpoint-bounding box. All the other patches in the same level that have not been marked as totally visible to the ancestors of the primary patch would become the secondary patches.

On each fuzzy projection face, the fuzzy extents of the secondary patches are computed. Each pair of these extents is compared. Since the extents are rectangles the test is simple and only involves a min-max test on each axis of the fuzzy projection face. If the fuzzy extents on all fuzzy projection faces of a secondary patch do not intersect the fuzzy extents of all the other secondary patches, the secondary patch do not occlude or be occluded by other patches from the primary patch. It is referred to as a totally visible/non-hiding patch.

Figure 1:
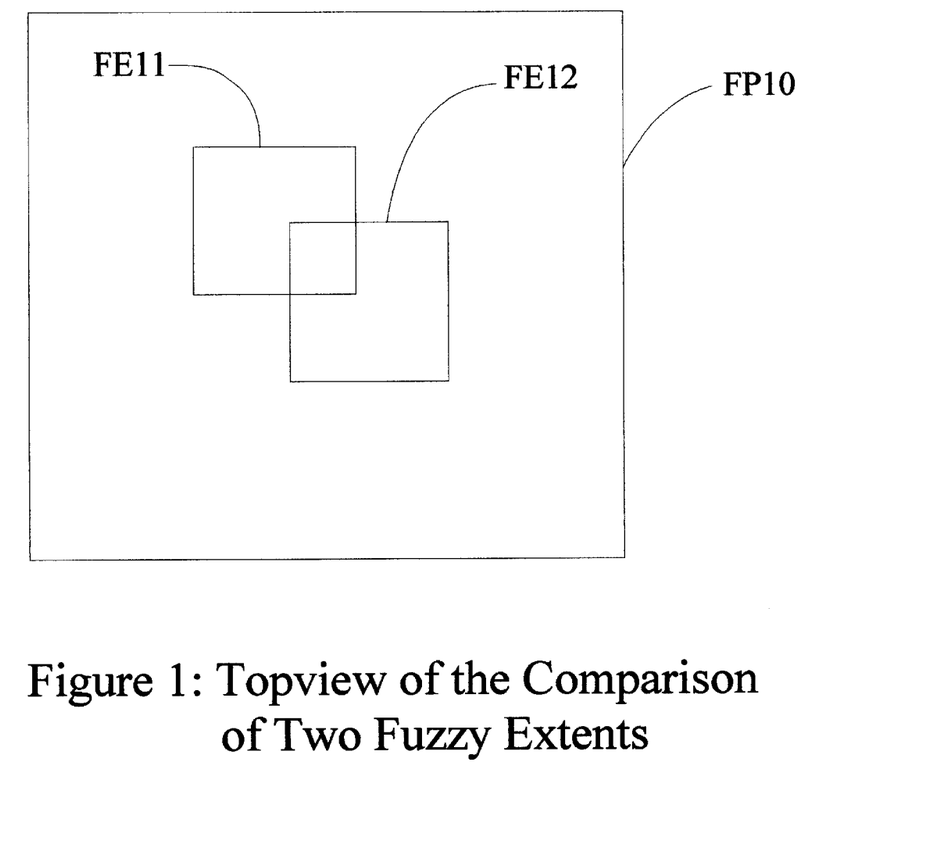
FIG. 1 shows the topview of the comparison of two fuzzy extents.

FIG. 1 shows the comparison of two fuzzy extents FE11 and FE12 on a fuzzy projection plane FP10.

Each child patch of the primary patch is selected and become the new primary patch. The above operations are again carried out. However, only the patches whose parents have not been found to be non-hiding/occluded with respect to the parent of the current primary patch need to he considered as secondary patches. This is because if a bounding box of a patch were totally visible/non-hiding from another patch, all the descendents of the former would also be totally visible/non-hiding from the descendent patches of the latter.

FIG. 5 shows the comparisons of the fuzzy extents of several patches on a fuzzy projection face. Patch A and B are not found to be totally visible, non-hiding to the current primary patch because their fuzzy extents overlap. Patch C is found to be totally visible/non-hiding as its fuzzy extent does not intersect the fuzzy extents of all other patches.

If the primary patch is subdivided from a surface, its fuzzy region always overlaps the fuzzy regions of patches connected to it. Hence the patch can never be found to be totally visible if the latter are not omitted. By assuming that surfaces do not hide themselves after backface culling, and by bypassing all patches belonging to the same surface, the problem can be overcome.

The computation of the fuzzy extent of an entity requires that the entity have a positive vertical distance from the current viewpoint-bounding box. Hence, if a patch whose surface is different from that of the current primary patch intersects its bounding box, the above computations cannot be correctly carried out. If this happens, both the patch and the viewpoint group are subdivided until there is no intersection between the bounding boxes of the subdivided patches and the viewpoint-bounding boxes of the subdivided viewpoint group.

2.3 The Fuzzy Buffer Method

The direct comparison method may be repeatedly applied for progressively lower levels until patches at the leaf level of the patch hierarchy have been processed. However, at and below certain level of the hierarchy, the number of patches acting as primary and secondary patches would become sufficiently large. Since the method requires all the pairs of secondary patches to be tested, the computation requires $O(n^2)$ time for each primary patch. Even though the comparisons of fuzzy extents are fast, the computations can be lengthy if n is large. The fuzzy buffer can be used to achieve linear time computations for each primary patch.

The difference between the fuzzy buffer used here and the one used in the basic technique for detecting totally invisible patches is that every pixel of the buffer now contains only a three-valued field called the homogeneous indicator. The indicator is zero if it is not within any fuzzy region. The indicator is one if it is inside the fuzzy projection of one surface. It is two if it is within the fuzzy projection of more than one surface. The homogeneous indicators of all pixels in the fuzzy buffer are first initialized to zero.

The fuzzy extent on each fuzzy projection face of each eligible patch in the current level is computed. Since pixellated computations are carried out, it is enlarged to contain all pixels beneath it Each pixel under the fuzzy region or fuzzy extent is accessed. The homogeneous indicator of the element is incremented by one if it is zero or one. However, no further increment of the indicator is necessary if the indicator is already two, since the pixel would already be under the projection of two or more surfaces.

After the fuzzy regions of all the surfaces have been updated into the fuzzy buffer, the pixels under the fuzzy extent of each patch are examined. If the homogeneous indicators of these elements are all one, the fuzzy region of the patch is under the fuzzy projection of one surface, which must be the surface of the patch. Hence only one surface can be seen from the current viewpoint-bounding box in all viewing directions within that fuzzy extent. The patch therefore cannot hide or be hidden by other surfaces from the current viewpoint-bounding box. Since it has been assumed that the surface do not hide itself from the current viewpoint-bounding box, the patch has to be a totally visible/non-hiding patch.

If some of the homogeneous indicators being accessed for the current patch are two, the patch may be hiding or be hidden by patches of other surfaces from certain viewpoints in the current viewpoint-bounding box. If any of the homogeneous indicators is zero, an error has occurred, as the corresponding element must be under the fuzzy projection of the current patch.

Using the above method, the time required to detect patches totally visible to each primary patch is only $O(n)$, where n is the number of secondary patches for the primary patch. Like the direct comparison method, it is repeatedly applied for progressively lower levels until all the patches in the leaf level have been processed. The resolution of the fuzzy buffer may also be increased for the next level so as to improve the accuracy of the fuzzy projection computations.

Description of the $3^{rd}$ Preferred Embodiment

If a model contains multiple rooms, many walls of these rooms may be totally visible, but they are also likely to be in front of other rooms. The technique mentioned in the last section cannot detect these walls, as they can only detect visible non-hiding patches. This problem can be overcome by the combined use of all the fuzzy projection techniques. With the simultaneous application of these techniques, much faster radiosity computations can be achieved.

If the current environment is a complicated architectural model, the first technique that has been disclosed is first carried out. The method determines rooms invisible to each room in the model.

Points on patches where the visibility of surrounding patches needs to be determined are treated as viewpoints. These viewpoints are grouped to form viewpoint groups. Each viewpoint group is accessed. The patch hierarchy is accessed from lop to bottom. At each level of the hierarchy, all patches not eliminated in the previous level are examined. Patches belonging to rooms invisible to the room the viewpoint group is in can be ignored. The basic fuzzy hidden surface algorithm is applied to eliminate patches totally invisible to the group. The remaining patches are then tested to determine whether they are totally invisible to the current viewpoint group. The direct comparison method or the fuzzy buffer method is used depending which method is more efficient.

The child patches of the remaining patches are accessed and the above processing repeated. The computations are carried out until the lowest level of the patch hierarchy has been processed. Only the patches at this level that have not been filtered off need to undergo detailed hemicube or ray tracing computations to determine their visibility with respect to each viewpoint in the current viewpoint group.

The pseudo-code of the above operation is shown below:

```
for (each room) {
    determine other rooms visible from that room;
}
for (each viewpoint-bounding box) {
    for (each level of the parch hierarchy) {
        compute the intervisibility of patches in the level;
        if (level is leaf level)
            applies elaborate hidden surface computations for patches
            whose intervisibility has not been determined;
    }
}
```

Description of the 4$^{th}$ Preferred Embodiment

The fuzzy buffer technique can be used to sample the environment to determine PVS. The hemicube, hemisphere or whatever shape being used is subdivided into a sampling pattern. Each grid cell of this pattern is defined to be a viewpoint-bounding box. From the viewpoint-bounding box, the fuzzy projection computations are being applied to determine surfaces always visible to the bounding box. First, from each sampling pattern, where a viewpoint-bounding box is placed, the technique for detecting invisible surfaces are applied to eliminate always invisible surfaces. This step may be skipped if the scene does not consist of many such surfaces, such as a single room in the radiosity computations. Optionally, the technique for computing always-visible surfaces are then applied to determine the always-visible surfaces from the same viewpoint-bounding box. Note that if the main concern is whether one polygon is totally visible to another, only the areas on the fuzzy projection planes under the fuzzy projection of the observed polygon need to be considered.

Description of the 5$^{th}$ Preferred Embodiment

The area that is obtained by subtracting the fuzzy region by the umbra region would yield the penumbra region. Normally, the penumbra region represents the view directions where the current surface is not seen by all viewpoints of the current group of viewpoints but may be seen by some or one of the viewpoints. However, because of the approximate computations applied, even if part or all the projection of a surface fall within the penumbra region, it could still be fully occluded. The region also represents the precision of the fuzzy computations. If the viewpoint-bounding box is larger than a surface, then the fuzzy projection of the surface would not yield any umbra region. The whole fuzzy region is a penumbra region.

The penumbra regions can be used to speed up the detection of always-invisible surfaces. The same fuzzy projection computations are carried out. However, not only the umbra region, the penumbra regions are computed for the surfaces that act as the occluders. If the part or all of the projection of a surface on the fuzzy projection plane falls outside the fuzzy region, then it cannot be occluded However, if any part of its projection is under the penumbra region, then it may be occluded from some or all part of the viewpoint-bounding box. The viewpoint-bounding box is subdivided into several sub-boxes (or sub-regions, if the box is 2-D). The same fuzzy projection computations are carried out on each sub-box. Again, if the surface is outside fuzzy region of any of the sub-box, then it is determined to be visible and no further processing of it is necessary. If it is within the umbra regions of all the sub-boxes, then it is fully hidden. If it is in any of the penumbra regions of the sub-boxes, then further subdivision of the associated sub-boxes are necessary. This subdivision of the sub-boxes would repeat until the visibility of all surfaces to be tested is known (fully occluded, partly occluded, or fully unoccluded) or the level of sub-boxes has reached a pre-defined value.

Description of the 6$^{th}$ Preferred Embodiment 6.1 The Limitations of Current Occlusion Culling Techniques Using the PVS (potentially visible set) approach, the environment needs to be structured and have many large occluding surfaces to act as occluders (such as a normal building). This approach is accurate but slow. Very long preprocessing time is needed to compute the PVS.

Using real-time z-buffer approach, culling is done at and for every point. This type of culling can be done for models that are unstructured and/or containing mostly small surfaces. However, unless the path of the user is completely predefined before the animation, the culling needs to be performed just before each frame to be displayed (real-time culling), where only by then the location of the viewpoint would be known. Even if the path is totally defined beforehand, the culling computations still face the storage problem as all the visibility data for every viewpoint would need to be stored. Another problem with culling just before the next frame (real-time culling) is that the culling computations are usually performed by the same computer that does the display. The culling and the display computations would compete for the same resources. In certain situations the culling can slow down the display speed instead. Also, since the culling are done on the display computer, the culling data cannot be as accurate as the PVS type of culling, which can usually be delegated to a fast computer or a processor farm and runs for hours and days. Because of the speed issue, models that are handled by the z-buffer type occlusion culling techniques cannot be too complicated, as the culling computations of a very complicated model may be too overwhelming. While it can substantially reduce the display computations, the total time of its own computations and the time still needed for the display computations could still be too much to achieve interactive frame rate.

6.2 Advantages of the New Technique

Using the new technique described here, PVS computations can be carried out on all types of models. The models can contain small surfaces and need not be well organized. There is also no necessity for a connected-graph for each model.

6.3 Procedure for the New Technique (1) The scene model to be displayed is divided into cells. Usually the cells are right prism in shape and not mutually overlapping, but the current technique is very flexible on the organization and structure of cells. The cells can be of any shape and they can also overlap each other. Hence, the cells may be hexagonal, spherical or cylindrical in shape. A model may even contain a mixture of cell types and the cells may have different sizes. There may be only a single layer of cells in a model, i.e. cells are at the side of each other and no cells are on top of others. The size, shape and the way the cells are connected can vary and may depend on the type and distribution of objects in these cells. The cells may also be hierarchically organized into a tree-like structure. A higher-level cell can contain cells within or overlapping with it. These cells may in turn contain sub-cells. The cells can be organized to give optimal culling. For example, the boundaries of cells can be defined to be coincident with the walls of rooms.

(2) Objects in the models are examined in a preprocessing stage. Depending on the sizes, orientations & types of the surface patches of these objects, the face of each cell is subdivided into sub-regions. Usually the sub-regions need to be considerably smaller than the surface patches (eg. 2, 3 or 4 times smaller) surrounding the cell so that the fuzzy projection can yield umbra regions that have useful size.

This size comparison can also be directional. Hence, the vertical dimensions of the surface patches determine the vertical dimension of the sub-regions, while the horizontal dimensions would match with the horizontal dimensions. If the cell locale is populated mostly with long and narrow vertically shaped objects, the sub-regions should also be long & thin, with the long side being vertical.

There are two approaches to selecting patches that are used to determine the dimension of the sub-regions. In the first approach, all the surface patches in the environment are used to determine the size. This is preferred if the model is relatively homogenous—the majority of surface patches that contribute as the occluders are of similar size and shape and occur almost everywhere throughout the model. In the second approach, patches close to and surrounding the current cell are used to determine the dimension of the sub-regions. Usually these patches belong to cells directly adjacent to the current cell. Patches belonging to cells one or two adjacent cells away from the current cell may also be considered.

(3) Fuzzy projection computations are carried out on each sub-region of each cell to be considered. The extent enclosing the current sub-region and whose edges are aligned with the axes of the world coordinate system is determined. The extent is treated as a viewpoint-bounding box and the fuzzy projection computations is carried out on it. Because the sub-region is two-dimensional, the viewpoint-bounding box is also 2-D and is called the viewpoint-bounding area.

It has been stated that the cells can have any shape. However, to optimize the fuzzy projection computations, the edges of the cells and the sub-regions should best be aligned with the axes of the world coordinate system. If this were the case, the extent of the subregions would coincide with the edges of the sub-regions. The viewpoint-bounding areas then would not overlap each other. This would eliminate redundant computations due to the overlapping.

Figure 7:
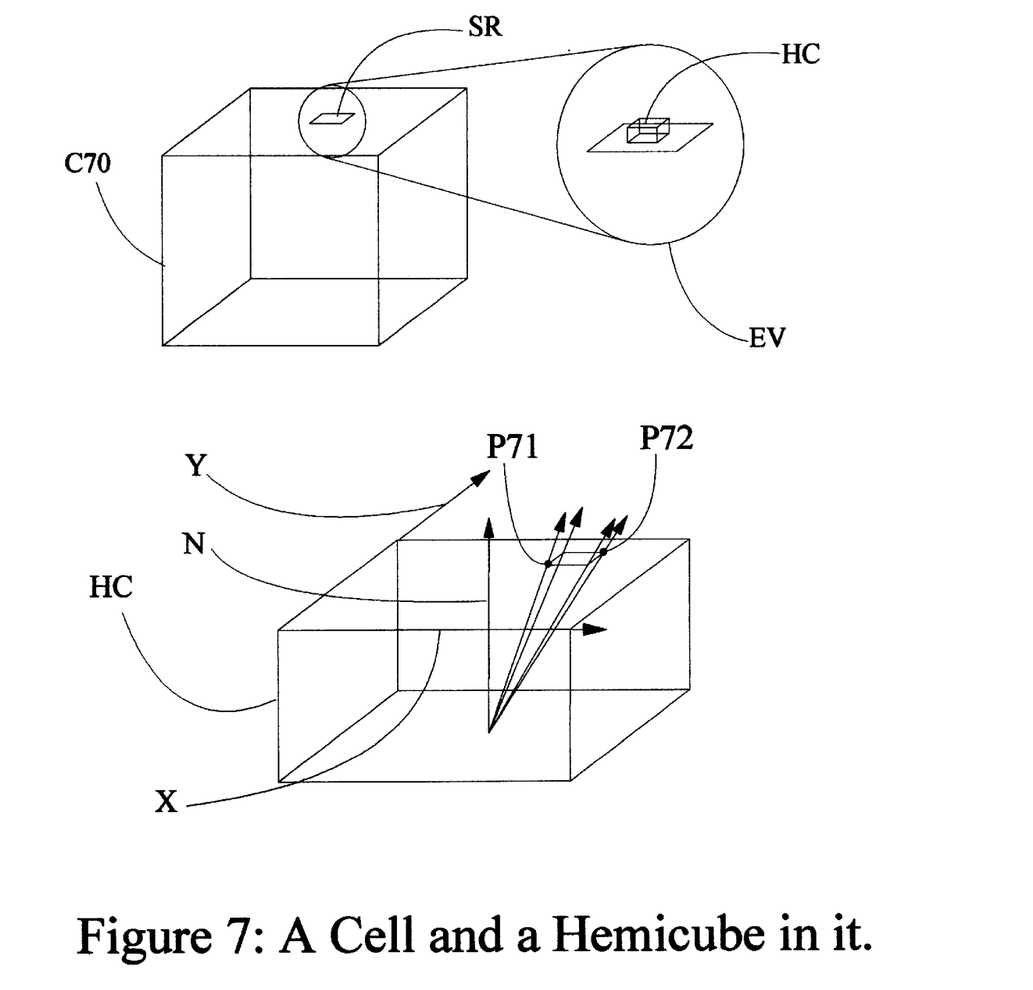
FIG. 7 shows different kinds of cells.

Using the viewpoint-bounding area as the base, the fuzzy projection computation computes the umbra regions with respect to the area. Note that in the projection, the viewing directions are restricted to those that emanate from the current cell (i.e. all views are looking out from the surface of the cell and into the surrounding, and not into the cell). Borrowing the technology from the radiosity method, a hemicube is defined for each sub-region. The hemicube is oriented such that its full square face is facing at the outward normal direction of the sub-region. Each face of the hemicube is tessellated into a grid (usually a regular grid, but an arbitrary or irregular grid can also be used). Each grid cell would correspond to a solid angle. However, unlike the normal hemicube but in accordance with the principle of fuzzy projection, the solid angle does not correspond to a point but to the whole sub-region. Hence, a grid cell with index x and y would represent a solid angle that subtends at the range (x, x+$\Delta$x, y, y+$\Delta$y). In another word, the cell represents all possible vectors that emanate from the sub-region and have a range of angles in the x & y direction as delimitated by (x, x+$\Delta$x, y, y+$\Delta$y). Each face of the hemicube now corresponds to a fuzzy projection plane and five fuzzy buffers are defined for each of the face of the hemicube. Each buffer is a 2D array of data. After multiplying a constant and transform it to start at zero, the range of angles at each cell now correspond to the index of the associated element. The fuzzy projection would compute umbra regions that store on the five fuzzy buffers that correspond to the five faces of a hemicube.

FIG. 7 shows the entities in the last paragraph. In it, C70 is the current cell, SR is a sub-region on one of its faces. EV is the enlarged view showing a hemicube HC being placed on SR. X and Y are the x and y index directions. N is the normal. P1 and P72 are the points (x, y) and (x+$\Delta$x, y+$\Delta$y).

Note that the hemicube is a totally mathematical entity. Points on its face represent the view direction but the dimension of the hemicube does not have any influence on the view direction. This is unlike the cells, which have geometric significance. The size of the cells would determine the efficiency of the computations.

Figure 8:
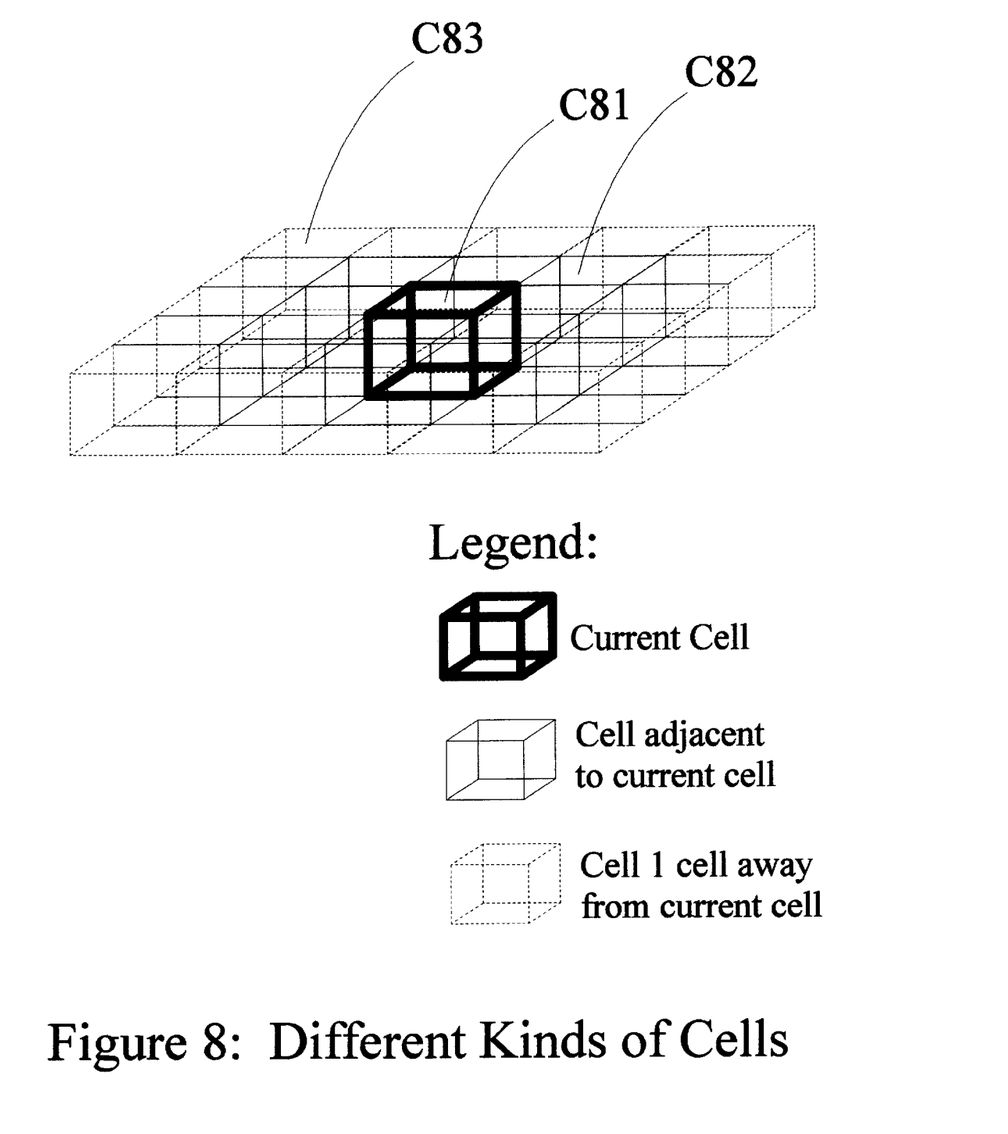
FIG. 8 shows a cell and a hemicube on a sub-region in it.

For each viewpoint-bounding area, the primary surface patches that are involved in the fuzzy projection would be those in the cells that are directly adjacent to the face of the current cell the viewpoint-bounding area is on. Note that this adjacency also includes cells that are diagonally connected (i.e. connected by their vertices). See FIG. 8 that shows the cells directly adjacent to the current cell (C81). These cells are referred to as the primary-connected cells (C82). If the processing time allows, or if the surfaces in these cells do not provide sufficient blocking, surface patches of the cells that are away from the current cell by one, two or more cells may also be involved in the fuzzy projection (eg. C83). The idea is to create sufficient umbra regions on the fuzzy projection face that can act as occluders.

(4) After the fuzzy projection of all the sub-regions on the faces of the current cell, the elements in all the fuzzy buffers that have the same index position and hence correspond to the same range of viewing directions are combined using the logical-And operations. All the hemicubes of the sub-regions on the same face of the cell have the same orientation. These hemicubes are deemed to be belonging to the same set. The combination operations of hemicubes within the same set are relatively simple. All the fuzzy buffers that correspond to the same side of these hemicubes would be compare Individual cells on different buffers but having the same x and y indices would be logical-AND'ed. However, the same faces of each set of hemicubes also share viewing with the same faces of another set of hemicubes. The cells that correspond to the same range of viewing directions also have to be logically-AND'ed. Moreover, the smaller sides (half a square) of a set of hemicubes are combined with the larger sides (full square) of another set of hemicubes. Hence, the combination operations of all the six sets of hemicubes create a full cube with six squares as its faces. The cube represents the combined fuzzy projections of all the viewing directions from all the faces of the current cell. This cube is referred to as the combined projection cube, and abbreviated as CPC. It has six fuzzy buffers. Each element represents a range of viewing direction from any point in the associated cell.

Figure 9:
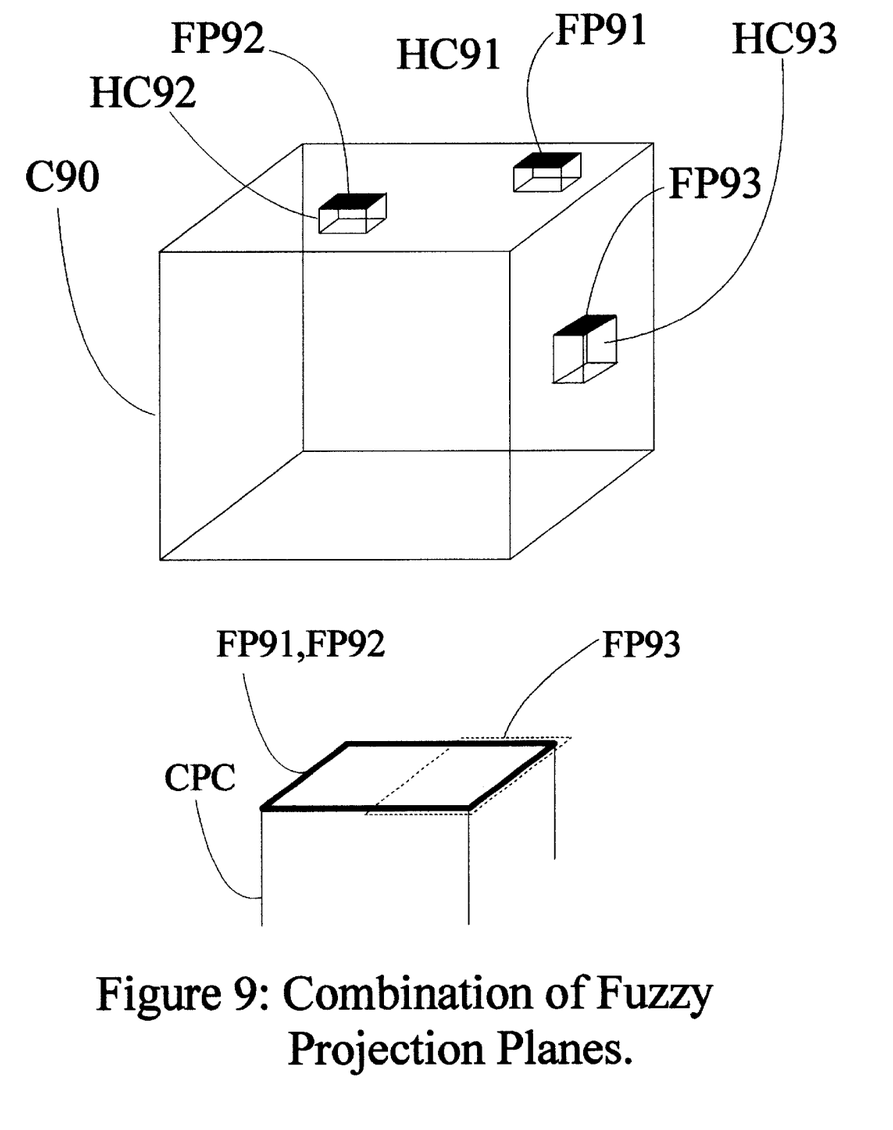
FIG. 9 shows the combination of fuzzy projection planes.

FIG. 9 shows how the different sides of the hemicubes are combined together In the figure, the fuzzy projection planes/faces FP91, FP92 and FP93 from hemicubes HC91, HC92 and HC93 are combined on the same face of the CPC as they are facing the same direction. The area and shape of FP91 and FP92 are identical. The area of FP93 on the CPC is shown by the dotted line.

The fuzzy buffer may use 0 & 1 to represent whether an element of the buffer is under the projection. Thus if any of the elements to be compared is empty (not under any umbra region), then as (0 AND 1) =0, the corresponding element of the CPC would always be 0. However, instead of using 0 and 1, a floating-point depth field can also be used to denote projection and non-projection. If this approach is used, the depth fields of the fuzzy buffers are initialized to infinity to indicate non-projection. During fuzzy projection, the fuzzy buffers are updated to store the largest depth values from each surface patch to the current viewpoint-bounding area (the largest depth value is used so that the result is erring on the side of caution). After the fuzzy projections of all the sub-regions of the current cell, the largest depth value of that exists in the corresponding elements in the fuzzy buffers of these sub-regions are taken as the depth of the associated element in the CPC. The choice of the largest depth follows the principle of erring on the side of caution, so that there is no danger of surfaces not hidden taken as hidden during the culling stage. Using this operation, if an element is not projected and hence its depth field is equal to infinity, that value will be written to the associated CPC element. That signifies that at least one of the elements in the fuzzy buffer is empty. This in turn indicates that there probably exists a viewing direction from the surface of the cell that is not blocked by the surfaces in the adjacent cells that have been considered in the fuzzy projection.

The CPC is the combination of the fuzzy buffers. This combination is done in a way that fuzzy elements having the same range of viewing direction would be combined. Hence, just like the fuzzy buffer, an element of the CPC corresponds to a unique range of viewing directions with respect to the current cell. Because of the nature of combining the fuzzy buffers, if the element of it is found to be covered (indicated by a value less than infinity in the corresponding depth field), all the viewing directions from every point on the surface of the cell and correspond to this element would be blocked by one or more surfaces. Since the faces of the cell fully encloses it, if an observer inside any point in the cell views the surrounding, then any viewing direction would coincide with a viewing direction on a point on the surface. Hence, it can deduce that if an element of the CPC were non-empty, than a viewer inside the cell would be blocked in the range of directions defined by the element, regardless of where he is inside the cell.

(5) The CPC thus formed can be easily used in culling. The CPCs of all cells are computed during preprocessing. During actual walkthrough, when a user is in a cell, the CPC of that cell is retrieved. Using the cell as the viewpoint-bounding box, the fuzzy regions of surfaces surrounding the cell are computed and compared with the elements of the CPC under their projections. To err on the side of caution, the depths computed for the fuzzy regions of the surfaces are the smallest possible depths of them from the surface of the cell. If an element of the fuzzy region of a surface has a depth smaller than the depth of the corresponding element of the CPC, the surface is likely to be unoccluded and cannot be culled. Otherwise the next element is tested. If all the elements pass the culling test, the surface would be fully occluded by the surfaces in the adjacent cells whose depth has been encoded in the CPC.

(6) Even more powerful culling can be achieved by combining the CPCs of multiple cells. From the cell the current viewer is in (this cell is referred to as the root cell), each of the first level of adjacent cells (cells that are directly connected to the current cell, this connection includes cells that are diagonally connected, i.e. connection by a corner only) within the field of view is tested with the CPC. This test is carried out by computing the fuzzy region of each adjacent cell, projecting them onto the CPC, and testing the depths of the former with the depth stored in the latter. The depth test has been described in the previous section. If the cell is found to be totally hidden by the CPCS, no further access to other cells from it is required. Otherwise those cells within the field of view, adjacent to the tested cell and further away from the root cell would be added into a list for further access. Note that a cell may be connected to several cells being tested. Hence the cell needs only be added to the list once. If at least one of the tested cells is not found to be totally hidden, the CPCs of all these cells are merged using logical-AND operation to form a new CPC. This CPC is then combined with the CPC of the root cell using LOGICAL-OR operations. These logical-OR operations are almost like the logical-AND operations between hemicubes described before. The same sides of fuzzy buffers are combined. However, the operation is logical-OR If depth fields are used instead, then the closest depth of two comparing elements is chosen to be the new element in the new CPC. Using this approach, if the depth field of an element of one CPC equals to infinity but the associated element does not equal to infinity, then the former is covered by one or more surfaces from all possible range of viewing directions defined by its (x, y) index but the latter is not covered One such example is any viewpoint within the current cell is not blocked by surfaces in the first layer of cells but always blocked by surfaces in the second layer of cells.

This resultant CPC after the logical-OR operation will be used for testing occlusion involving the next level of cells. Note that even if a cell were found to be totally hidden, surfaces in it would need to be checked for visibility. That is because part of the data in the CPC is derived from the surfaces in it. Hence the testing can cull cells and surfaces further than it, but not itself or its surfaces.

After all the adjacent cells have been tested, the cells adjacent and further away and have been marked for further access would be tested in turn. These are the cells that are away from the root cell by one cell (i.e. from the root cell, at least another cell has to be passed through before reaching any of them). If any of them fails the occlusion test, then cells within the field of view, connected to it and even further away from the root cell would be marked for access. In a densely occluded model the access would end after the access of several levels of cells. Hence, this achieves an effect similar to the recursive access of rooms in a building model in a typical PVS way of occlusion culling.

The recursive access described here achieves breath-first searching of cells surrounding the root cell The recursion would repeat until all cells and surfaces that are likely to be seen by the root cell have been accessed. The pseudo-code of the recursive access operations is shown below:

```
Assign all cells connected to the root cell and within field of view to CELL_LIST;
Set NEXT_CELL_LIST to null;
Use the CPC of the root cell as Testing_CPC;
while the CELL_LIST is not empty {
    for each cell in the CELL_LIST {
        test the cell against the Testing_CPC;
        if the cell is not totally hidden by the Testing_CPC {
            for (each cell within the field of view & connected to the test cell) {
                add the cell to the NEXT_CELL_LIST if it has not been added to the list;
            }
        }
        check visibility of surfaces in the cell with the Testing_CPC;
    }
    combine CPCs of NEXT_CELL_LIST by logical_AND to
    form another CPC, combine this CPC with Testing_CPC to form
    yet another CPC, use this CPC as Testing_CPC from now on;
    replace all entries in CELL_LIST by cells in NEXT_CELL_LIST;
    set NEXT_CELL_LIST to null;
}
```

(7) The fuzzy buffer of each CPC can be further encoded to form a pyramid. The pyramid is a set of fuzzy buffers with increasing resolutions. Each cell of a buffer covers $n^2$ cells of the buffer at the next level. Usually n is 2. Using the pyramid, depth tests may be carried out from the root or one or more higher level nodes of the pyramid. A surface, cell or CPC to be tested can also be encoded to form a pyramid to test with the former. Hence, high-level nodes of 2 pyramids may be tested first (such as comparing the combined depth of each node). If further test is needed, the next level nodes are accessed and compared. Whether one or both pyramids need to descend one level depends on the comparisons that determine whether the descent is necessary.

(8) Several cells can be merged to form a higher-level cell. The CPC of the latter is the logical-AND of the cells being merged. By continue the merging process, a hierarchy of cells can be formed. Each level of cells can be treated as a normal cell in the computation.

(9) When computing the fuzzy projection of surfaces on a hemicube, surfaces straddling the side of cell need not be subdivided at the side. The projection may fall outside the projection plane that that can automatically taken care of during projection.

Description of the 7$^{th}$ Preferred Embodiment

The display of models that consists of many moving or changing tiny surfaces has always been a big challenge in 3D computer graphics. Traditional display and occlusion culling techniques are ineffective on them. An example of such a model is a forest model. The method disclosed here can be used for effective occlusion culling of these models.

If surfaces are moving, how much of the time it would fully cover a fuzzy buffer element of a sub-region is computed. The computation yields the probability of the full projection of the surface on the fuzzy buffer element. The probability value ranges from 0 to 1. This can be done by sampling (checking many times on many points within the area of the element over a period of time) or by computing the function of projection over the fuzzy buffer element based on the shape function governing the geometric shape of the surface and the motion function of that surface (if it exists). One simple example is the shape function that describes a sphere with center (x1, y1, z1) and radius R. The movement function of the viewpoint can also be used in the computation of this projection function. For example, the function can be expressed as $(x-x1)^2+(y-y1)^2+(z-z1)^2=(R(t))^2$, where the radius of the sphere may be changing over the time t. The projection on a fuzzy projection plane is in the form $X-X')^2+(Y-Y')^2=R'^2$. X' and Y' are variables correspond to a point inside the viewpoint-bounding box and that have a range delimited by it. If in whatever range of X' and Y' the function is always valid (having a solution), the probability value would be 1. If in whatever range of X' and Y' the function is always invalid, the probability value would be 0. Otherwise, the probability would be the percent of space within the viewpoint-bonding box where the function is valid.

If there are many surfaces projecting on the element, then the probability of having at least a surface fully projected on it is $1-P_1 * P_2 * P_3 \ldots * P_{N-1} * P_N$, where N is the number of surfaces. If the probability is very low (e.g. less than 0.0001) then the viewing directions associated with the element and emanating from the associated viewpoint-bounding box can be safely assumed to be fully occluded by at least one of the surfaces.

Sampling can also be used if it is known a priori that a group of surfaces with the same kind of motion are inside a cube. Some fuzzy buffer elements on the hemicubes of some sub-regions of the cube are sampled. Ideally, these elements should be randomly chosen. The standard deviation (SD) and mean of the probability of surfaces projecting on these elements can also be found. Using this method, the t-table is looked up. From the population of the surface, the mean and standard deviation, one can infer, within an X % confidence interval, how likely the viewing directions associated with an element is being occluded. Usually X has to be set at a fairly high value to ensure that the likelihood of errors is small.

The same operation can be further applied to the CPCs. By comparing the standard deviations and means of the sampled elements on different areas of the CPC, the properties of these areas can also be determined. Based on the X % confidence interval test mentioned, some areas may be deemed to be fully occluded while some other areas may be assigned a probability value to be logical-OR with the next level of CPCs.

When a CPC is to be logical-OR'ed with the combined CPC of the next level of cells, the probability values (mean and SD of the probability) of all the associated elements in the cells are logically-OR'ed. The central limit theorem is to be used to obtain the new mean and SD. Namely, the mean remains the same. The new SD is equal to $SD_{original}/n$, where n is the average number of surfaces in each cell.

The method disclosed here can also be modified for the analysis of visible surfaces. The fuzzy projection technique for computing surfaces always visible to a group of viewpoints is carried out. However, the statistical computation can detect surfaces that have a higher than negligible probability that they are not hidden. For a surface projected at a fuzzy clement on a hemicube or CPC, this involves determining the surfaces that also project on the element and nearer to the associated group of viewpoint, and checking how likely these surfaces would occlude in the range of viewing directions associated with this element. Because this computation is with respect to a group of viewpoints or a cell (in the case of CPC), it is likely that there are several surfaces that can be visible to the current group of viewpoints. Each surface would then have its own probability value for being visible. Once the probability values are obtained, the estimated surface intensity with respect to the range of viewing direction associated with that element can be determined by summing the product of the probability of how likely each surface is visible with its surface intensity. Note that the surface intensity can also be a function of time. This information can be used for rendering. For example, in the rendering of fast moving scene, the estimated intensity can be used instead of the traditional rendering methods.

What is claimed is:

1. A method of detecting, before hidden surface computations, surfaces or their sub-elements that are invisible, wherein said surfaces or their sub-elements are excluded from said hidden surface computations, said detecting step comprises the steps of determining the penumbra regions; and checking, for each surface whose visibility is to be determined, whether the projection of said surface falls within on said penumbra regions.

2. A method of detecting, before hidden surface computations, surfaces or their sub-elements that are invisible, wherein said surfaces or their sub-elements are excluded from said hidden surface computations, said detecting step comprises the steps of determining the fuzzy buffer elements under which said surfaces or their sub-elements are projected;

computing the probability of whether each of said elements is occluded by at least a surface;

finding out whether said areas are fully occluded by comparing said probabilities with a predefined value.

3. The method of claim 2, wherein step computing further comprises the step of determining the new combining the fuzzy projections.

4. The method of claim 2, wherein said probabilities are related to the shape function of a surface.

5. The method of claim 2, wherein said probabilities are related to the motion function of a surface.

6. The method of claim 2, wherein said probabilities are obtained by statistical table lookup.

7. The method of claim 2, wherein said step computing further includes the step of computing the probabilities of combined projection cubes.

* * * * *